April 19, 1927.

R. W. CANFIELD 1,625,590

APPARATUS FOR SHAPING GLASSWARE

Filed June 26, 1926

Inventor:
Robert W. Canfield
by Robert S. Brown
Atty.

Patented Apr. 19, 1927.

1,625,590

UNITED STATES PATENT OFFICE.

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR SHAPING GLASSWARE.

Application filed June 26, 1926. Serial No. 118,743.

This invention relates to apparatus for shaping glassware, and has particular relation to pressing apparatus for shaping blanks for electric lamp bulbs and other paste-mold glassware, such as the apparatus disclosed in my copending application for Letters Patent, Serial No. 31,315, filed May 19, 1925, of which the present application is a continuation in part.

This application is concerned particularly with the blank mold and its associated pressing plunger, and the principal object of the present invention is to improve the surface quality of the blanks and the distribution and quality of the finished ware.

When blanks for past-mold glassware are formed in iron molds, as has been customary heretofore, a relatively thick skin or enamel is produced on the outer surfaces of the blanks, probably because of the high heat-conductivity of the metal molds, and this skin, although removed somewhat by reheating, persists to a greater or less extent in the finished article. The skin often ruptures irregularly and produces noticeable "alligator" effects in the blanks, causing defects in the finished articles and interfering with proper distribution of the glass.

According to my present invention, I make the body of the blank mold from non-metallic material having sufficient heat conductivity to mold the glass in continuous operation without sticking to the glass, such as the carbon compositions ordinarily used for electric brushes. I have discovered that a blank mold of such non-metallic material does not produce the surface irregularities referred to above, and that the blanks produced in such a mold resemble hand-marvered blanks and produce bulbs, tumblers and other paste-mold ware having better distribution and greater freedom from defects than has been produced before by automatic machinery Non-metallic blank molds, of the kind described herein, have the further advantage that the mold material does not extract as much heat from the glass as metallic molds, and yet it is of sufficient thermal conductivity to transmit heat through its mass and dissipate it to the atmosphere with sufficient rapidity to result in a glass-contacting surface of uniform temperature below that at which the glass will adhere to the mold.

Another object of my present invention is to provide a suitable holder for the carbon blank mold, equipped with means for preventing the inner edges of the molding cavity from chipping or otherwise becoming deformed so as to mar the blanks or produce peripheral fins upon them.

Figure 1:
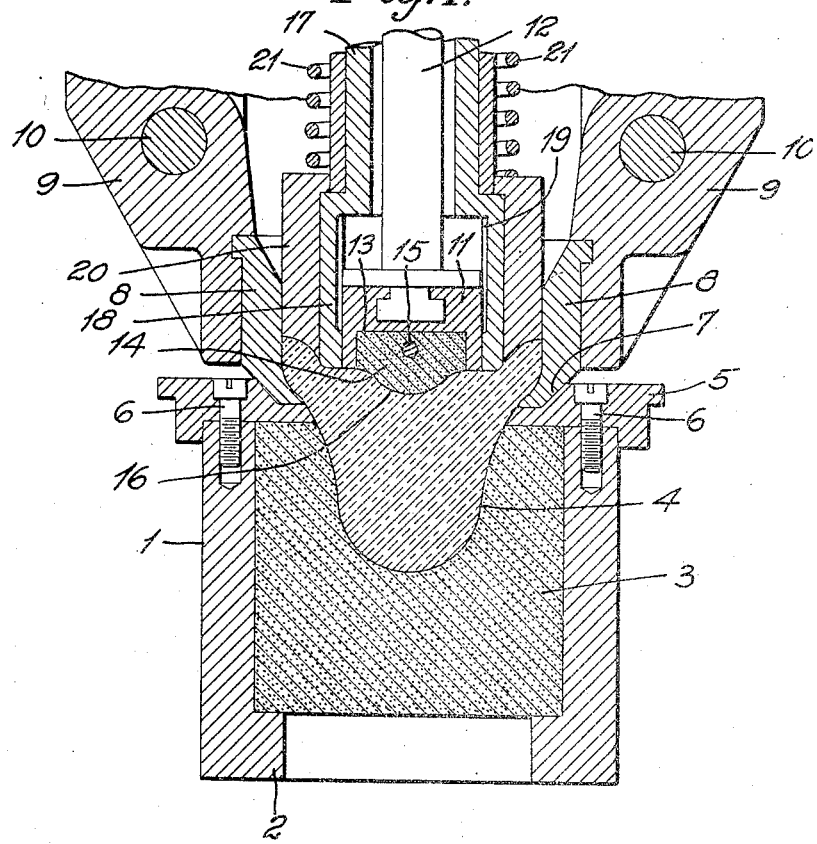
Figure 2:
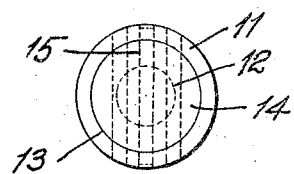

In the accompanying drawings:

Figure 1 is a vertical sectional view through a combined blowhead and pressing plunger and its cooperating press mold, both of these elements being provided with carbon inserts according to the invention; and Fig. 2 is a bottom plan view of the carbon insert or tip of the pressing plunger.

Referring to the drawing, a press mold for lamp bulb blanks is illustrated as comprising an outer metallic cylindrical shell 1 which is supported in any suitable manner and which is provided with a flange 2 at its inner lower edge, which constitutes a seat for a brush-carbon insert 3 having a mold cavity 4 formed therein. The insert 3 is prevented from becoming displaced from the shell 1 by means of a metallic retaining member 5, preferably in the form of a ring, which is removably secured to the shell 1 by means of screws 6 and which extends over the upper surface of the insert 3 to a point adjacent to the edge of the mold cavity 4 and protects the edge of the cavity against injury during the blank-forming operation.

The upper surface of the ring 5 is provided with a beveled recess 7 which forms a seat for the correspondingly beveled lower edge of a neck ring 8. This neck ring is formed in complementary sections which are removably carried by a pair of neck ring holders 9 which are pivotally mounted upon pins 10 for swinging movement, in order to permit the neck ring to open and close.

The pressing plunger, as shown, comprises an inner metallic head 11 which is detachably secured to a vertical stem 12 and which may be provided with a recess 13 for the reception of a carbon tip or insert 14. This tip is held in position by a pin 15 and is provided with a convex lower surface 16 for forming the initial blow opening in the blank The carbon tip may be omitted, as there is no great advantage in the use of carbon material at this point.

The stem 12 extends coaxially through and in spaced relation with a tube 17 which communicates with a supply of blowing air and which is provided at its lower extremity with a cylindrical shell 18 within which the head 11 is adapted to slide. The inner surface of the shell 18 is provided with a plurality of vertical grooves 19 which terminate above the lower edge of the shell so as to provide a glass-tight fit with the head 11.

A stripper ring 20 surrounds the shell 18 and is yieldably held in the position shown by a spring 21. This spring is sufficiently strong to cause the stripper ring to force the glass freely and uniformly against the sides of the mold, but will yield to allow excess glass to extrude upwardly between the neck ring 8 and the shell 18.

At the conclusion of the pressing operation the mold is removed, leaving the bare blank suspended from the neck ring 8. The blowing of the blank is then commenced by lifting the stem 12, thereby elevating the head 11 and establishing communication between the supply of blowing air and the initial blow opening in the blank through the tube 17 and the grooves 19, which operation is described in detail in my copending application above referred to.

The above-described construction eliminates the tendency for molds of a carbon composition to chip or to otherwise become damaged at the edge of the mold cavity, thereby materially prolonging their life and rendering it possible to secure the advantages incident to the use of molds of such material, namely, the production of ware that is substantially free from scars or other blemishes and having a high surface luster, and at the same time obtaining an increased rate of production.

The carbon mold body 3 cannot be made of any carbon composition indiscriminately, because most carbon compositions have such low heat-conductivity that they will not convey away the heat of molten glass rapidly enough to prevent the glass from sticking to the mold. One class of carbon compositions that satisfies the requirements of my present invention as to heat-conductivity is the class of compositions commonly used for electric brushes. However, other suitable non-metallic materials may be found or prepared, and my invention is therefore not restricted to the use of brush compositions only.

For the purpose of enabling the blank mold to be operated at higher speeds, the shell 1 may be water-jacketed. Such artificial cooling of the blank mold increases the rate at which the glass is cooled in the mold, and enables the molding of a greater number of charges per minute.

The improved quality of blanks made in the carbon molds described above has been demonstrated by changing from carbon molds to iron molds with unchanged glass conditions, and I have found that the defects which result from the use of iron molds are completely avoided when such carbon blank molds are used.

Modifications may be made in construction, arrangement and mode of operation, without departing from the scope of the invention as defined in the appended claims.

I claim as my invention:

1. A press mold for making glass blanks for paste-mold glassware, comprising a mold body of carbon material having sufficient thermal conductivity to mold molten glass without sticking thereto.

2. A press mold for making glass blanks for paste-mold glassware, comprising a mold body of electric brush carbon composition.

3. Apparatus for shaping glassware, comprising a mold of carbon composition, and a pressing plunger cooperating therewith and having a glass-engaging surface of carbon composition.

4. Apparatus for shaping glassware, comprising a mold having an outer metallic shell and a carbon insert provided with a mold cavity, a plunger for pressing a charge of glass in said cavity, and a metallic member secured to said shell and extending over the upper surface of said insert to the edge of said mold cavity.

5. In combination with a pressing plunger, a mold comprising an outer metallic shell, an insert of carbon composition mounted in said shell and provided with a mold cavity, and a metallic member secured to said shell and extending over the upper surface of said insert to the edge of said cavity and adapted to protect said edge against injury under the action of said plunger.

6. In combination with a pressing plunger, a mold comprising a metallic shell, an insert of carbon composition removably mounted in said shell and provided with a mold cavity, and a metallic member removably secured to said shell and projecting over the upper surface of said insert to the edge of said cavity and adapted to maintain said insert against displacement and to protect the edge of said cavity against injury under the action of said plunger.

7. In combination with a mold having a carbon insert provided with a mold cavity, a plunger for pressing mold charges in said cavity, comprising a metallic member provided with an insert of carbon composition for engagement with the glass charge in said cavity.

Signed at Hartford, Conn., this 25th day of June, 1926.

ROBERT W. CANFIELD.